US012726907B2

(12) United States Patent
Garner et al.

(10) Patent No.: US 12,726,907 B2
(45) Date of Patent: Sep. 1, 2026

(54) SELECTIVE COMMUNICATION SCHEME UTILIZATION FOR REDUCING POWER CONSUMPTION FOR A BATTERY-POWERED DEVICE

(71) Applicant: ROKU, INC., San Jose, CA (US)

(72) Inventors: Gregory M. Garner, Key Colony Beach, FL (US); Robert C. Curtis, Napa, CA (US); Manas C. Saksena, San Jose, CA (US); Scott E. de Haas, Austin, TX (US)

(73) Assignee: ROKU, INC., San Jose, CA (US)

( * ) Notice: Subject to any disclaimer, the term of this patent is extended or adjusted under 35 U.S.C. 154(b) by 307 days.

(21) Appl. No.: 18/482,739

(22) Filed: Oct. 6, 2023

(65) Prior Publication Data

US 2025/0119838 A1 Apr. 10, 2025

(51) Int. Cl.
*H04W 52/02* (2009.01)
*H04W 76/10* (2018.01)
*H04W 84/12* (2009.01)

(52) U.S. Cl.
CPC ....... *H04W 52/0258* (2013.01); *H04W 76/10* (2018.02); *H04W 84/12* (2013.01)

(58) Field of Classification Search
CPC . H04W 52/0258; H04W 76/10; H04W 84/12; H04W 88/04
See application file for complete search history.

(56) References Cited

U.S. PATENT DOCUMENTS

2012/0026895 A1 2/2012 Wentink
2018/0124704 A1* 5/2018 Jung ................ H04W 52/0229
(Continued)

FOREIGN PATENT DOCUMENTS

CN 115150812 A 10/2022
EP 4294063 A1 12/2023

OTHER PUBLICATIONS

Extended European Search Report for European Application No. EP24204144, mailed on Mar. 3, 2025, 11 pages.

*Primary Examiner* — Mohammad S Anwar
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for establishing a communication link between a battery-powered device and a WAP to reduce the power consumption burden of the battery-powered device. In an embodiment, a communication context of the battery-powered device and the WAP is determined, for example, by determining whether there is at least one intermediate device having a wired power source via which the battery-powered device can communicate with the WAP. A communication scheme of a plurality of different communication schemes is selected, for example, by selecting the communication scheme of the plurality of different communication schemes that imposes the lowest power consumption burden on the battery-powered device and is also supported by the communication context. At least one of the battery-powered device or the WAP is configured for communication therebetween using the selected communication scheme.

20 Claims, 9 Drawing Sheets

(56) References Cited

U.S. PATENT DOCUMENTS

2018/0352514 A1* 12/2018 Singh ...................... H04W 4/02
2021/0007104 A1 1/2021 Raghavan et al.
2022/0030665 A1* 1/2022 Nakanishi ........... H04L 12/4641

* cited by examiner

SELECTIVE COMMUNICATION SCHEME UTILIZATION FOR REDUCING POWER CONSUMPTION FOR A BATTERY-POWERED DEVICE

BACKGROUND

Field

This disclosure is generally directed to techniques for reducing power consumption.

SUMMARY

Provided herein are system, apparatus, device, method and/or computer program product embodiments, and/or combinations and sub-combinations thereof, for establishing a communication link between a battery-powered device and a wireless access point (WAP). The battery-powered device and the WAP may be configurable for communication therebetween utilizing one of a plurality of different communication schemes, each of which imposes a different power consumption burden on the battery-powered device. The plurality of different communication schemes comprises one or more schemes in which the battery-powered device communicates directly with the WAP and one or more schemes in which the battery-powered device communicates indirectly with the WAP through at least one intermediate device having a wired power source. In an embodiment, a communication context of the battery-powered device and the WAP is determined, for example, by determining whether there is at least one intermediate device having a wired power source via which the battery-powered device can communicate with the WAP. A communication scheme of a plurality of different communication schemes is selected, for example, by selecting the communication scheme of the plurality of different communication schemes that imposes the lowest power consumption burden on the battery-powered device and is also supported by the communication context. At least one of the battery-powered device or the WAP is configured for communication therebetween using the selected communication scheme In an embodiment, determining the communication context of the battery-powered device and the WAP comprises determining that there is at least one intermediate device having the wired power source via which the battery-powered device can communicate with the WAP, wherein the at least one intermediate device and the battery-powered device communicate via a first wireless communication protocol, and determining that the at least one intermediate device and the battery-powered device support a second wireless communication protocol that imposes a relatively lower power consumption burden on the battery-powered device than compared to the first wireless communication protocol, wherein selecting the communication scheme of the plurality of different communication schemes comprises selecting the communication scheme in which the at least one intermediate device and the battery-powered device communicate via the second wireless communication protocol.

In another embodiment, the first wireless communication protocol comprises a Wi-Fi-based communication protocol and the second wireless communication protocol comprises a Bluetooth Low Energy (BLE) long range-based communication protocol.

In yet another embodiment, determining the communication context of the battery-powered device and the WAP comprises determining that there is at least one intermediate device having the wired power source via which the battery-powered device can communicate with the WAP, wherein the at least one intermediate device and the battery-powered device communicate via a mesh network, and selecting the communication scheme of the plurality of different communication schemes comprises selecting a communication scheme in which one or more parameters of the mesh network are updated to reduce the power consumption burden on the battery-powered device.

In still another embodiment, the one or more parameters comprise a delivery traffic indication map (DTIM) interval setting associated with at least one of the battery-powered device or the at least one intermediate device.

In a further embodiment, determining the communication context of the battery-powered device and the WAP comprises determining that there is no intermediate device and that the battery-powered device communicates directly with the WAP, wherein the WAP and the battery-powered device communicate via a first wireless communication protocol, and determining that both the battery-powered device and the WAP support a second wireless communication protocol that imposes a relatively lower power consumption burden on the battery-powered device than compared to the first wireless communication protocol, and wherein selecting the communication scheme of the plurality of different communication schemes comprises selecting the communication scheme in which the WAP and the battery-powered device communicate via the second wireless communication protocol.

In yet a further embodiment, the first wireless communication protocol comprises a Wi-Fi 5-based communication protocol and the second wireless communication protocol comprises a Wi-Fi 6-based communication protocol.

In a further embodiment, determining the communication context of the battery-powered device and the WAP comprises determining that there is no intermediate device and that the battery-powered device communicates directly with the WAP, wherein the WAP and the battery-powered device support a single wireless communication protocol and communicate via a first delivery traffic indication map (DTIM) interval, and determining that a DTIM interval setting is configurable at one or more of the battery-powered device or the WAP, and wherein selecting the communication scheme of the plurality of different communication schemes comprises selecting the communication scheme in which a second DTIM interval is utilized for one or more of the WAP or the battery-powered device, wherein the second DTIM interval imposes a relatively lower power consumption burden on the battery-powered device than compared to the first DTIM interval.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
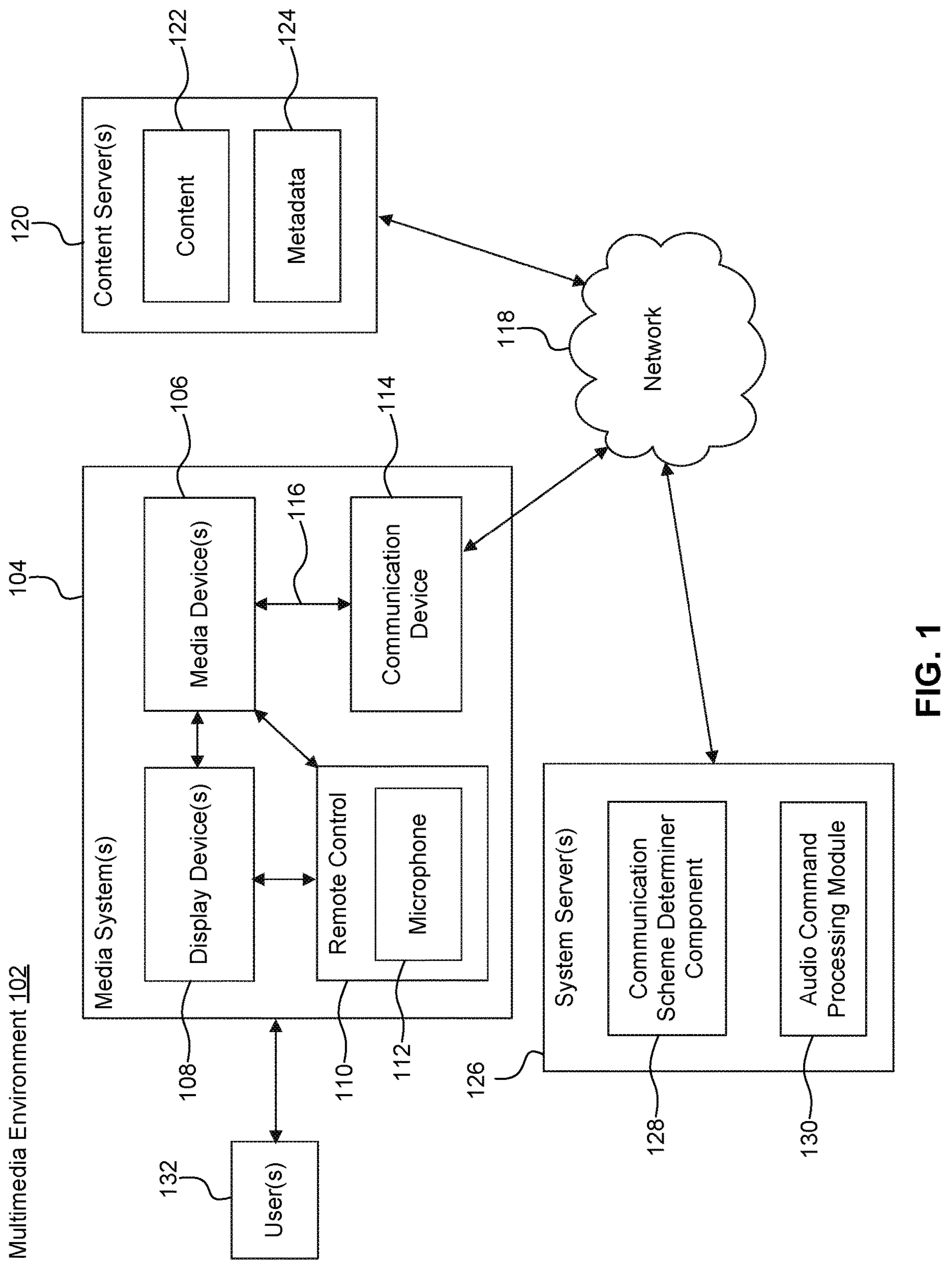
FIG. 1 illustrates a block diagram of a multimedia environment, according to some embodiments.

Data communication networks may include various hubs, switches, routers, and other network devices, interconnected and configured to handle data as it passes through the network. Data and/or commands originating from a source network device may be relayed via other network devices until it reaches a destination network device, such as a wireless access point (WAP). While WAPs are generally connected to an external power source, other network devices, such as certain Internet-of-Things (IoT) devices, are battery powered. Such network devices may implement various power management modes in an effort to increase battery life. Such management modes may include a power save (or sleep) mode, where a network device powers down its radio when it is not being utilized. While in the power save mode, the network device may periodically awake and activate its radio to detect beacon signals, which may indicate that the network device is to transition to a power on state and perform a particular action, such as transmitting or receiving data. It has been observed that such techniques, while conserving power, still result in significant power consumption and affects the overall life of the battery.

Embodiments described herein may address some or all of the foregoing issues related to battery-powered devices. For instance, a communication link may be established between a battery-powered device and a WAP utilizing a communication scheme that reduces the power consumption burden on the battery powered device. To establish the communication link, the techniques described herein may determine whether an intermediate device, powered via a wired power source, is available for establishing the communication link. Characteristics of the battery-powered device and the intermediate devices may be analyzed to determine one or more communication schemes that are supported by the battery-powered device and the WAP. Based on the characteristics, the communication scheme that imposes the lowest power consumption burden on the battery-powered device may be selected, and the battery-powered device and/or the WAP may be configured accordingly.

For example, in embodiments, a communication context of the battery-powered device and the WAP may be determined, for example, by determining whether there is at least one intermediate device having a wired power source via which the battery-powered device can communicate with the WAP. A communication scheme of a plurality of different communication schemes may be selected, for example, by selecting the communication scheme of the plurality of different communication schemes that imposes the lowest power consumption burden on the battery-powered device and is also supported by the communication context. At least one of the battery-powered device or the WAP may be configured for communication therebetween using the selected communication scheme.

By determining and utilizing a communication scheme that imposes the lowest power consumption burden, the amount of power consumed by the battery-powered device and the life of its battery is vastly improved (e.g., by 50%). Accordingly, the techniques described herein improve the functioning of a device (e.g., an IoT device), as such devices are able to operate for longer periods due to the extended battery life.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

Figure 3:
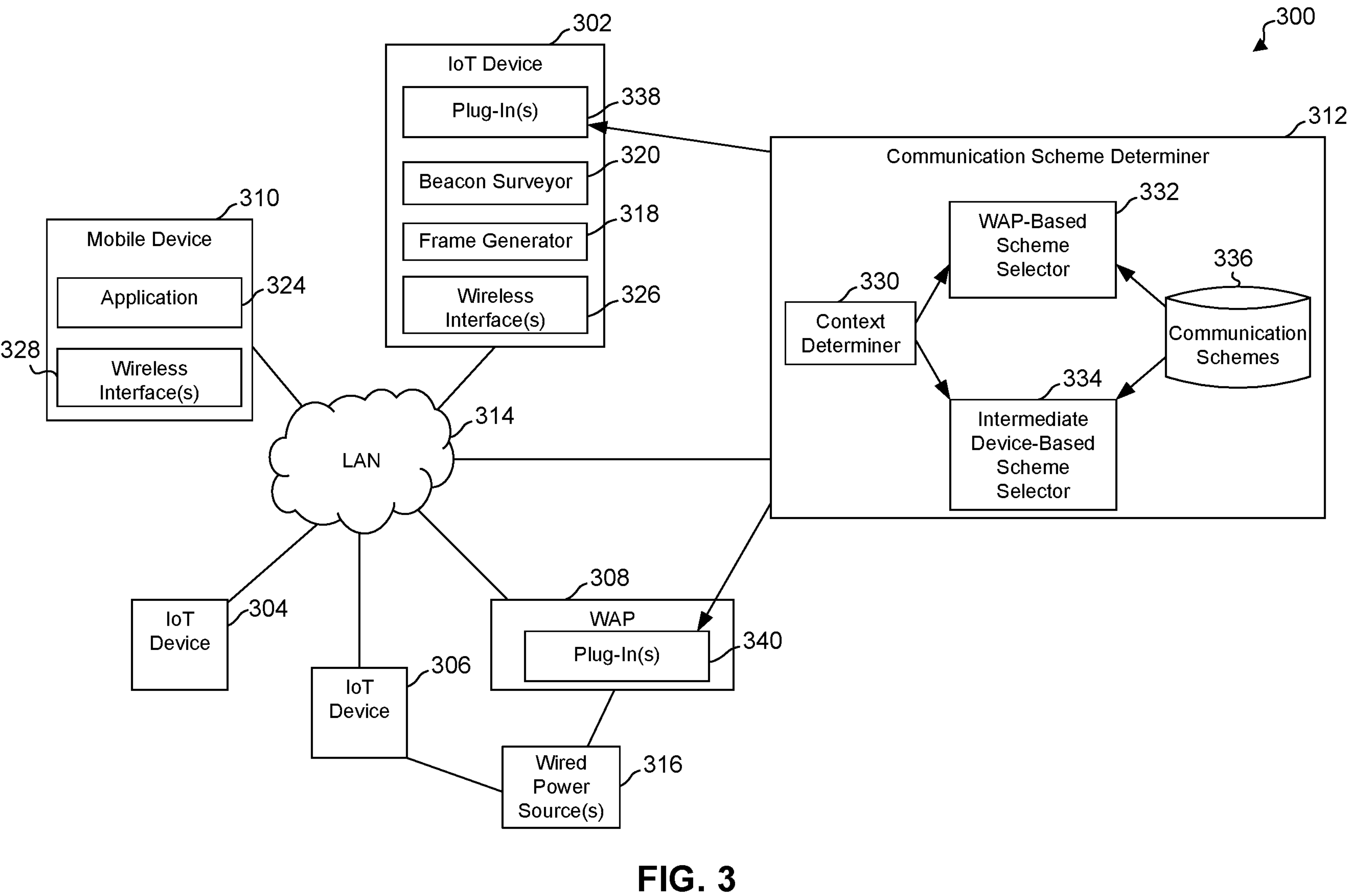
FIG. 3 illustrates a block diagram of a system for reducing power consumption for a battery-powered device, according to some embodiments.

The system servers 126 may include a communication scheme determiner component 128. Communication scheme determiner component 128 may be configured to determine a communication scheme for a device, such as media device 106, and a WAP. The communication scheme imposes a relatively lower power consumption burden for the device. An indication of the communication scheme may be provided to the device over network 118. Media device(s) 106 may communicate with the WAP in accordance with the communication scheme. Additional details regarding communication scheme determiner component 128 are described below with respect to communication scheme determiner 312, as shown in FIG. 3.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
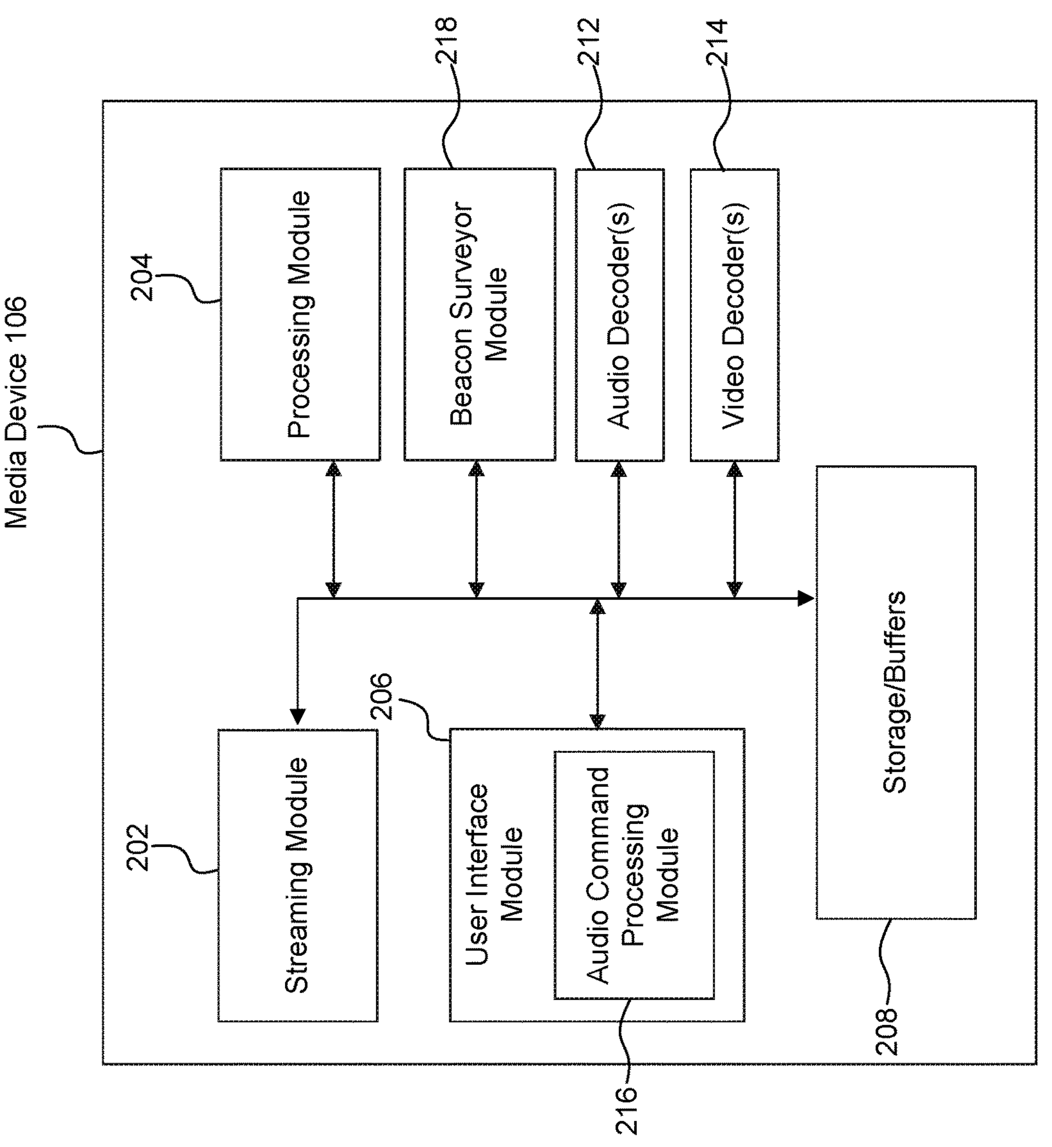
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Selective Communication Scheme Utilization for Reducing Power Consumption for a Battery-Powered Device As further shown in FIG. 2, media device 106 may include a beacon surveyor module 218. Beacon surveyor module 218 may be configured to perform a beacon survey with respect to other media device(s) and/or a WAP to determine various characteristics thereof based on beacon signals received therefrom. The determined characteristics may be provided to communication scheme determiner component 128 via network 118. As described herein, communication scheme determiner component 128 may be configured to determine a communication scheme for a device, such as media device 106, and a WAP. Additional details regarding beacon surveyor module 218 are described below with respect to beacon surveyor 320, as shown in FIG. 3.

FIG. 3 illustrates a block diagram of a system 300 for reducing power consumption for a battery-powered device, according to some embodiments. As shown in FIG. 3, system 300 includes a plurality of IoT devices 302, 304, and 306, a wireless access point (WAP) 308, a mobile device 310, and a communication scheme determiner 312. Although only three IoT devices are shown for the sake of illustration, it should be understood that system 300 may include any number of IoT devices, including tens, hundreds or even thousands of IoT devices.

As used herein, the term "IoT device" is intended to broadly encompass any device that is capable of engaging in digital communication with another device. For example, a device that can digitally communicate with another device can comprise an IoT device, as that term is used herein, even if such communication does not occur over the Internet.

Each of IoT devices 302, 304, and 306 may comprise a device such as, for example, a smart phone (e.g., mobile device 310), a laptop computer, a notebook computer, a tablet computer, a netbook, a desktop computer, a video game console, a set-top box, an OTT streaming media player, or media device 106. Furthermore, each of IoT devices 302, 304, and 306 may comprise a so-called "smart home" device such as, for example, a smart lightbulb, a smart switch, a smart refrigerator, a smart washing machine, a smart dryer, a smart coffeemaker, a smart alarm clock, a smart smoke alarm, a smart carbon monoxide detector, a smart security sensor, a smart doorbell camera, a smart indoor or outdoor camera, a smart door lock, a smart thermostat, a smart window sensor, a smart motion sensor, a smart plug, a smart television, a smart speaker, a smart remote controller, or a voice controller. Still further, each of IoT devices 302, 304, and 306 may comprise a wearable device such as a watch, a fitness tracker, a health monitor, a smart pacemaker, or an extended reality headset. However, these are only examples and are not intended to be limiting.

IoT devices 302, 304, and 306 may be communicatively connected to a local area network (LAN) 314 via a suitable wired and/or wireless connection. In an embodiment, LAN 314 is implemented using a hub-and-spoke or star topology. For example, in accordance with such an embodiment, each of IoT devices 302, 304, and 306 may be connected to a router via a corresponding Ethernet cable, WAP 308, or IoT device hub. The router may include a modem that enables the router to act as an interface between entities connected to LAN 314 and an external wide area network (WAN), such as the Internet. In an alternate embodiment, LAN 314 is implemented using a mesh network topology. For example, in accordance with such an embodiment, one or more of IoT devices 302, 304, and 306 may be linked directly to the other two IoT devices such that it can communicate directly therewith utilizing unassociated media access control (MAC) frames without a router or WAP 308. Unassociated MAC frames may be MAC frames that are unassociated with WAP 308 (i.e., such MAC frames do not specify a base service set (BSS) identifier (ID) of WAP 308) and are locally administered (i.e., the universal/local (U/L) bit of the MAC addresses included in the MAC frame may be set to a value of 1), for example, by a user or network administrator during setup of the mesh network. However, these are examples only, and other techniques for implementing LAN 314 may be used.

One or more the devices included in system 300 may be battery-powered, while other device(s) included in system 300 may be powered via a wired connection to a power source. For instance, as shown in FIG. 3, IoT devices 302 and 304 may be battery-powered, and IoT device 306 and WAP 308 may be powered via one or more wired power source(s) 316. Wired power source(s) 316 may comprise any power source that connects IoT device 306 and WAP 308 to an alternating current (AC) power supply of a premise (e.g., a house, of office building, etc.) or a direct current (DC) power supply of a vehicle via one or more wires. Examples of wired power source(s) 316 include, but are not limited to, a wall outlet, lightbulb socket, etc.

As further shown in FIG. 3, IoT device 302 may comprise a frame generator 318, a beacon surveyor 320, and one or more wireless interfaces 326. Frame generator 318 may be configured to generate various types of MAC frames. For example, frame generator 318 may be configured to generate beacon MAC frames (also referred herein as beacons or beacon signals). Each beacon signal may be generated periodically or may be generated in response to a particular event (e.g., a change in power state or operation of IoT device 302). The beacon signal may uniquely identify IoT device 302 (e.g., via a unique MAC address assigned thereto) and may be broadcasted to a plurality of other IoT devices (e.g., IoT devices 304 and 306) and/or WAP 308. The beacon signal may be utilized by IoT devices (e.g., IoT device 304 and/or 306) and/or WAP 308 to discover IoT device 302 and/or to determine whether IoT device 302 is operating. The payload of beacon signal may also comprise data that indicates one or more particular states (e.g., a power state, an operational state, etc.) of IoT device 302, one or more wireless communication protocols supported thereby, an indication of a power source utilized thereby (e.g., whether IoT device 302 is battery-powered or powered via wired power source(s) 316).

Another type of MAC frame that may be generated by frame generator 318 is a group broadcast frame. A group broadcast frame may be configured to simultaneously deliver commands and/or any other types of data to a group of IoT devices. Such a MAC frame may specify a group MAC address corresponding to a plurality of IoT devices included in the group.

A further type of MAC frame that may be generated by frame generator 318 is a unicast MAC frame. A unicast MAC frame may reliably delivered to a specific destination MAC address. Such frames may be acknowledged by a receiving device via a PHY-ACK protocol. Such a MAC frame may specify a MAC address that uniquely identifies the single device (e.g., an IoT device or WAP 308) for which the unicast MAC frame is intended.

Beacon surveyor 320 may be configured to perform a beacon survey with respect to the other IoT devices (e.g., IoT device 304 and/or 306) and/or WAP 308 communicatively coupled to IoT device 302 to determine various characteristics based on beacon signals received by IoT device 302. For example, beacon surveyor 320 may determine a modulation coding scheme (MCS) utilized by IoT device 302, a received signal strength for IoT device 302 based on beacon MAC frames received thereby, a signal-to-noise ratio for beacon MAC frames received by IoT device 302, an error rate and/or loss frequency based on beacon MAC frames received by IoT device 302, etc. Beacon surveyor 320 may also log the received beacon MAC frames. For example, beacon surveyor 320 may maintain an identifier of the device from which beacon MAC frames are received and a timestamp at which beacon MAC frames were received. Beacon surveyor 320 may also determine other characteristics of IoT devices 304 and/or 306 and/or WAP 308 based on beacon surveying, including, but not limited, an identifier (e.g., a MAC address) associated with IoT devices 304 and/or 306 and/or WAP 308 that is included in the beacon signal(s) respectively received therefrom, information included in the beacon signal(s) that respectively identify a function of IoT devices 304 and/or 306 and/or WAP 308, whether IoT devices 304 and/or 306 and/or WAP 308 are battery powered or powered via a wired power source, etc. Indications of the foregoing characteristics may be stored in a memory of IoT device 302 and/or may be provided to communication scheme determiner 312 (e.g., via a MAC frame via wireless interface(s) 326).

In an embodiment, beacon surveyor 320 may be configured to periodically perform beacon surveys to determine the characteristics described above. In another embodiment, beacon surveyor 320 may be configured to perform a beacon survey before transitioning to a standby state. Each time a beacon survey operation is performed by beacon surveyor 320, indications of the characteristics may be stored in memory. This may be performed to detect any changes in the environment in which IoT device 302 is located. Such changes may include whether or not an IoT device that was previously detected via beacon surveying is powered off and/or no longer in the environment.

Wireless interface(s) 326 comprise components suitable for enabling IoT device 302 to wirelessly communicate with other devices via a corresponding wireless protocol. For example, wireless interface(s) 326 may be configured to transmit and/or receive MAC frames, as described above. Wireless interface(s) 326 may include, for example and without limitation, one or more of: a Wi-Fi interface that enables IoT device 302 to wirelessly communicate with WAP 308 or other remote Wi-Fi-capable device according to one or more of the wireless network protocols based on the IEEE (Institute of Electrical and Electronics Engineers) 802.11 family of standards; a cellular interface that enables IoT device 302 to wirelessly communicate with remote devices via one or more cellular networks; a Bluetooth interface (e.g., a Bluetooth Low Energy (BLE) long range interface) that enables IoT device 302 to engage in wireless communication with other Bluetooth-enabled devices; or a Zigbee interface that enables IoT device 302 to wirelessly communicate with other Zigbee-enabled devices.

Each of IoT devices 304 and 306 may include similar components to those shown with respect to IoT device 302. Thus, for example, each of IoT device 304 and 306 may include a frame generator, a beacon surveyor, one or plug-ins, or one or more wireless interfaces.

WAP 308 may configured to broadcast beacon MAC frames to devices communicatively coupled thereto, such as IoT device(s) of IoT device 302, 304, and 306 and mobile device 310. Such beacon MAC frames may identify WAP 308 and/or various characteristics or capabilities of WAP 308. The beacon MAC frames may also comprise information regarding packet traffic queued for different devices communicatively coupled to WAP 308. Such information may be specified via a traffic indication map. The transmission of beacon MAC frames may be periodic. The periodicity is set in multiples of transmission units (TUs). Each TU may be equivalent to 1024 microseconds. 100 TUs (~100 milliseconds) may be set as the default beacon transmission time. The time at which a beacon is expected to be broadcast may be referred to as a target beacon transmission time (TBTT). The time interval between two TBTTs may be referred to as a beacon interval. A subset of beacon MAC frames transmitted by WAP 308 may be delivery traffic indication map (DTIM) beacon MAC frames. The interval at which DTIM beacon MAC frames are transmitted (i.e., the DTIM interval) may be a multiple of the beacon interval. The DTIM interval may be configurable. For example, if the beacon interval is 100 milliseconds and the DTIM interval is set to 3, then every third beacon MAC frame that is transmitted by WAP 308 is a DTIM beacon MAC frame. DTIM beacon MAC frames may indicate to IoT devices 302, 304, and/or 306 that data queued at WAP 308 is to be broadcasted to IoT devices 302, 304, and/or 306 immediately after the transmission of the DTIM beacon MAC frame. The beacon MAC frames transmitted by WAP 308 may indicate the DTIM interval utilized by WAP 308 and/or whether or not the DTIM interval is configurable. IoT devices 302, 304, and/or 306 may utilize the DTIM interval to determine when to wake up and listen for broadcasts. The longer the DTIM interval, the less IoT devices are required to wake up, thereby resulting in a longer battery life.

An event at one IoT device may cause another IoT device to be activated. For example, consider a scenario in which IoT device 304 is a smart doorbell or a smart motion sensor and IoT device 302 is a smart camera. Upon activation, IoT device 304 may provide a command (via a MAC frame) either directly to IoT device 302 or indirectly via another IoT device (e.g., IoT device 306) or via WAP 308 to activate and provide a video stream.

In another scenario, mobile device 310 may cause IoT device 302 to be activated. For example, mobile device 310 may comprise an application 324 configured to activate IoT device 302. For instance, application 324 may be a home security application that enables the user to activate a camera via one or more user interface elements (e.g., a button). Upon activation of such user interface element(s), application 324 may provide a command to IoT device 302. The command may be included in a MAC frame that is transmitted via wireless interface(s) 328 of mobile device 310. Wireless interface(s) 328 may transmit the MAC frame to WAP 308, and WAP 308 may transmit the MAC frame to IoT device 304.

By way of example only and without limitation, mobile device 310 may comprise a smart phone, a laptop computer, a notebook computer, a tablet computer, a netbook, a handheld video game console, a wearable device (e.g., smart watch, extended reality headset), or a remote control.

Wireless interface(s) 328 comprise components suitable for enabling mobile device 310 to wirelessly communicate with other devices (e.g., IoT devices 302, 304, and/or 306 and/or WAP 308) via a corresponding wireless protocol. Wireless interface(s) 328 may include, for example and without limitation, one or more of: a Wi-Fi interface that enables mobile device 304 to wirelessly communicate with an access point or other remote Wi-Fi-capable device according to one or more of the wireless network protocols based on the IEEE 802.11 family of standards; a cellular interface that enables mobile device 304 to wirelessly communicate with remote devices via one or more cellular networks; or a Bluetooth interface that enables mobile device 304 to engage in short-range wireless communication with other Bluetooth-enabled devices.

Communication scheme determiner 312 may be configured to determine a communication scheme for a battery-powered IoT device that imposes the lowest power consumption burden on the battery-powered IoT device. As shown in FIG. 3, communication scheme determiner 312 may comprise a context determiner 330, a WAP-based scheme selector 332, an IoT-based scheme selector 334, and a data store 336 that stores a plurality of different communication schemes. Each of the different communication schemes may impose a different power consumption burden on a battery-powered IoT device. For example, one communication scheme may cause a battery-powered IoT device to consume less power than another communication scheme.

Context determiner 330 may be configured to determine a communication context between one or more battery-powered IoT devices (e.g., IoT devices 302 and 304) and one or more devices powered via a wired power source (e.g., WAP 308, IoT device 306 and/or one or more intermediate (e.g., relay) devices coupled therebetween). For example, for each battery-powered IoT device, context determiner 330 may analyze the characteristics obtained by beacon surveyor 320 of that device. In an example in which a communication context is determined for IoT device 302, context determiner 330 may analyze the identifier(s) of devices from which IoT device 302 received beacon signals, along with capability information included in such beacon signals, including, but not limited to, whether such devices are battery-powered or powered via wired power source. In some aspects, communication scheme determiner 312 may maintain a mapping that associates a device identifier (e.g., a MAC address) of a particular device to its capabilities. Such capabilities may include an indication as to whether or not the device is battery-powered or powered via a wired power source or whether the device is WAP 308. The mapping may be generated by a manufacturer of a device in which communication scheme determiner 312 is incorporated and may be updated via a software update and/or configurable by the user. In accordance with such aspects, such capabilities may not be conveyed via beacon signals, as the capabilities may be determined via the mapping.

In the event that context determiner 330 determines that IoT device 302 communicates with just an intermediate device, context determiner 330 may analyze the characteristics obtained by beacon surveyor 320 of the intermediate device to determine whether the intermediate device directly communicates with WAP 308 or another intermediate device. Context determiner 330 may continue to perform the foregoing analysis to determine a relay path by which IoT device 302 may communicate with WAP 308. In the event that more than one relay path is determined, context determiner 330 may analyze reliability characteristics of beacon signals (as obtained by beacon surveyor 320) transmitted between the devices in the relay path. Such reliability characteristics include, but are not limited to, received signal strengths, signal-to-noise ratios, error rates and/or loss frequency, etc., based on beacon MAC frames received by the devices in the relay path. Context determiner 330 may utilize devices for the relay path that transmit and/or receive beacon MAC frames with the greatest signal reliability (e.g., a signal reliability that meets or exceeds a particular threshold).

Context determiner 330 may determine whether or not IoT device 302 communicates directly with WAP 308 or indirectly with WAP 308 via an intermediate device having a wired power source based on the analysis of the device identifiers and/or the capability information described above. In response to determining that IoT device 302 communicates directly with WAP 308, context determiner 330 may provide a first indication to WAP-based scheme selector 332. Context determiner 330 may also provide capability information of IoT device 302 and/or WAP 308 to WAP-based scheme selector 332. In response to determining that IoT device 302 communicates indirectly with WAP 308 via an intermediate device, context determiner 330 may provide a second indication to intermediate device-based scheme selector 334. Context determiner 330 may also provide capability information of IoT device 302 and/or the intermediate device to intermediate device-based scheme selector 334.

Data store 336 may store a plurality of WAP-based communication schemes and a plurality of intermediate device-based communication schemes. Examples of WAP-based communication schemes include, but are not limited to, utilizing a first particular DTIM interval to transmit DTIM beacon MAC frames that is longer than a default DTIM interval, utilizing a second particular DTIM interval to transmit DTIM beacon MAC frames that is longer than the first particular DTIM interval, or utilizing a different wireless communication protocol (e.g., a Wi-Fi 6-based communication protocol) that imposes a relatively lower power consumption burden than compared to another wireless communication protocol (e.g., a Wi-Fi 5-based communication protocol). In an example, a Wi-Fi 6-based communication protocol may be leveraged to impose a relatively lower power consumption burden by utilizing the target wake time (TWT) feature, which enables devices to decide when and how often they wake up to receive or send data in an effort to conserve power. Each of the WAP-based communication schemes may be ranked based on power consumption burden. In an example, utilizing the first particular DTIM interval may result in the highest power consumption burden, utilizing the second particular DTIM interval may result in the next highest power consumption burden, and utilizing a different wireless communication protocol may result in the lowest power consumption burden of the WAP-based communication schemes. Examples of intermediate device-based schemes include, but are not limited to, utilizing an intermediate device that is included a mesh network for relaying data to WAP 308 or utilizing a different wireless communication protocol (e.g., a BLE long range-based communication protocol) that imposes a relatively lower power consumption burden than compared to another wireless communication protocol (e.g., a Wi-Fi based communication protocol). Each of the intermediate device-based power communication may be ranked based on power consumption burden. In an example, utilizing an intermediate device included in a mesh network may result in the highest power consumption burden and utilizing a different wireless communication protocol may result in the lowest power consumption burden of the intermediate device-based communication schemes.

In response to receiving the first indication, WAP-based scheme selector 332 may select a WAP-based communication scheme from data store 336. The WAP-based communication scheme may be selected based on the capabilities of IoT device 302 and/or WAP 308. In the event that more than one communication scheme is supported by IoT device 302 and/or WAP 308, WAP-based scheme selector 332 may select the WAP-based communication scheme that imposes the lowest power consumption burden on IoT device 302. For example, if the capability information indicates that IoT device 302 and/or WAP 308 support configurable DTIM intervals, but not different wireless communication protocols, WAP-based scheme selector 332 may select a WAP-based communication scheme that utilizes the longest DTIM interval. In another example, if the capability information indicates that both IoT device 302 and WAP 308 supports a Wi-Fi 6-based communication protocol, then WAP-based scheme selector 332 may select a WAP-based communication scheme that supports Wi-FI 6-based communication. WAP-based scheme selector 332 may configure IoT device 302 and/or WAP 308 accordingly. For instance, WAP-based scheme selector 332 may set the DTIM interval utilized by WAP 308 and/or IoT device 302 in accordance with the selected scheme or provide a command to both IoT device 302 and WAP 308 to utilize the communication protocol in accordance with the selected scheme.

In response to receiving the second indication, intermediate device-based scheme selector 334 may select an intermediate device-based communication scheme from data store 336. The intermediate device-based communication scheme may be selected based on the capabilities of IoT device 302 and the intermediate device (e.g., IoT device 306). In the event that more than one communication scheme is supported by IoT device 302 and the intermediate device, intermediate device-based scheme selector 334 may select the intermediate device-based communication scheme that imposes the lowest power consumption burden on IoT device 302. For example, if the capability information indicates that IoT device 302 and the intermediate device are part of a mesh network, but do not support different wireless communication protocols, intermediate device-based scheme selector 334 may select an intermediate-based communication scheme that leverages power optimizations available via the mesh network (e.g., configurable DTIM settings). In another example, if the capability information indicates that both IoT device 302 and the intermediate device supports a BLE long range-based communication protocol, then intermediate device-based scheme selector 334 may select an intermediate device-based communication scheme that supports BLE long range-based communication.

To configure IoT device 302 and/or WAP 308 with a selected scheme, WAP-based scheme selector 332 and intermediate device-based scheme selector may provide one or more plug-ins (shown as plug-in(s) 338 and plug-in(s) 340) that, when executed, causes IoT device 302 and/or WAP 308 to implement the configuration. Plug-in(s) 338 and 340 may comprise code and/or data that may be implemented and/or executed by software (e.g., an operating system) executed on IoT device 302 and/or WAP 308.

In some aspects, the communication schemes may utilized for certain operations at IoT device 302. For instance, the communication schemes may indicate that a different communication protocol or DTIM interval is to be utilized for just transmitting and receiving DTIM beacon MAC frames. After IoT device 302 wakes up and receives a DTIM beacon MAC frame, IoT device 302 may return to utilizing its original communication scheme and perform its intended function, such as providing a video stream. In other aspects, the communication schemes are not operation specific. In such aspects, IoT device 302 may continue to utilize the different communication scheme to perform its intended function.

In some aspects, communication scheme determiner 312 may utilize machine learning-based techniques to determine whether a particular intermediate device is to be utilized to establish a communication link between IoT device 302 and WAP 508 and/or which communication scheme is to be utilized. For instance, a machine learning model may analyze historical data collected from a plurality of different IoT devices and WAPs. Such data may comprise signal reliability characteristics associated with beacon MAC frames transmitted and received from such devices via each of the communication schemes described herein, timestamps at which such beacon MAC frames were transmitted and/or received via each of the communication schemes described herein, etc. Based on such data, the machine learning model may learn thresholds for when to utilize each communication scheme, as well as learn when a particular intermediate device should be utilized.

During inference, the machine learning model may receive, as inputs, such signal reliability characteristics and such timestamps as determined by beacon surveyor 320, and output recommended intermediate device(s) (if applicable) for establishing a communication link between IoT device 302 and WAP 308, along with a recommended communication scheme. In some aspects, the recommended communication scheme may be time-specific. For example, the machine learning model may determine that one communication scheme should be utilized during the day and another communication scheme should be utilized during the night.

In some aspects, the machine learning model may analyze the timestamps at which beacon MAC frames were received by IoT device 302 and determine a periodicity at which a beacon MAC frame is received (e.g., whether a beacon MAC frame is received hourly, daily, weekly, etc.). Based on the foregoing characteristics, machine learning model may determine the operational behavior of such the devices from which the beacon MAC frames were received (e.g., whether a device is powered on, or powered off, or performing a particular operation, or a pattern of usage indicating when (e.g., times and/or days) the devices are powered on, powered off, or performing a particular operation). Based on an analysis of the timestamps, the machine learning model may determine an intermediate device to be utilized based on the time of day or based on whether a particular intermediate device is turned on or turned off. Accordingly, in certain instances, a first intermediate device may be utilized to relay signals from a battery-powered device to WAP 308, and in other instances, a second intermediate device may be utilized to relay signals from the same battery-powered device to WAP 308.

In some aspects, the machine learning model may recommend to place an intermediate device that is powered via a wired power source in a particular location based on the analysis of the signal reliability characteristics. For instance, the machine learning model may determine that the signal reliability between IoT device 302 and an intermediate device may be improved if placed within closer proximity. In response to such a determination, communication scheme determiner 312 may provide a prompt to a user indicating that IoT device 302 may experience better battery life if a particular intermediate device is placed within a particular distance of IoT device 302. In another example, an intermediate device may comprise a robot or other device capable of self-locomotion. In such an example, communication scheme determiner 312 may provide a command to such a device to automatically move to the location recommended by the machine learning model.

In some aspects, communication scheme determiner 312 may include a map of the premises in which IoT devices 302, 304, and 306, WAP 308, and/or mobile device 310 are located. The map may be generated based on sensing techniques, where sensors (e.g., a camera or other optical sensor, a microphone, a radar system, a LiDAR system, a Wi-Fi sensing system, a proximity sensor, an infrared sensor, a radio frequency (RF)-based sensing system, etc.) are utilized to generate a map of the premises. Based on the map, the machine learning model may determine that a particular object is causing an obstruction between IoT device 302, an intermediate device, and/or WAP 308, and recommend (e.g., via a prompt to the user) that the object be removed to improve the battery life of IoT device 302.

Communication scheme determiner 312 may be implemented by a device (e.g., a server) that is remote from the premise in which IoT devices 302, 304, and 306 are located but communicatively connected to at least one of IoT devices 302, 304, and 306 via WAP 308. Alternatively, communication scheme determiner 312 may be implemented by a device within the premise in which IoT devices 302, 304, and 306 are located, such as by one or more of IoT devices 302, 304, and 306.

Figures 4A, 4B:
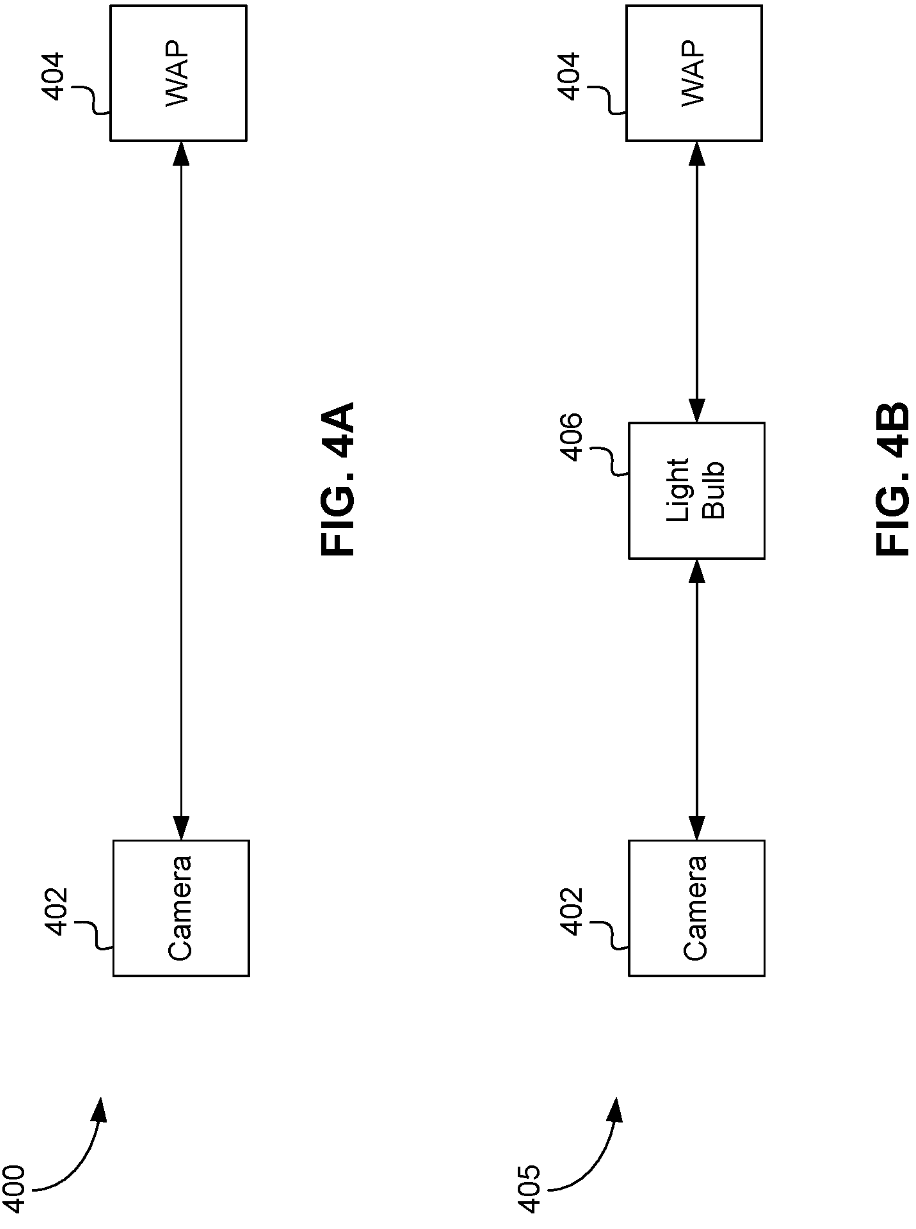
FIG. 4A a block diagram for establishing a communication link, according to some embodiments.
FIG. 4B is a block diagram of a system for establishing a relay-based communication link, according to some embodiments.

FIG. 4A is a block diagram of a system 400 for establishing a communication link, according to some embodiments. As shown in FIG. 4A, system 400 may include an IoT device 402, such as smart camera, and a WAP 404. As shown in FIG. 4, IoT device 402 has established a communication link with WAP 404. Context determiner 330 may determine that IoT device 402 has established a communication link with WAP 404 based on characteristics provided by beacon surveyor 320 and may provide a first indication to WAP-based scheme selector 332, accordingly. WAP-based scheme selector 332 may determine whether IoT device 402 and/or WAP 404 support configurable DTIM intervals. In response to determining that IoT device 402 and/or WAP 404 support configurable DTIM intervals, WAP-based scheme selector 332 may select the conversation scheme that utilizes a DTIM interval that imposes the lowest power consumption burden for IoT device 402.

At some point, a user may utilize another IoT device that may serve as an intermediate (or relay) device for relaying data between IoT device 402 and WAP 404. For example, FIG. 4B is a block diagram of a system 405 for establishing a relay-based communication link, according to some embodiments. As shown in FIG. 4B, system 405 may include IoT device 402, an IoT device 406, such as a smart lightbulb, and WAP 404. IoT device 406 may be powered via a wired power source, such as a lightbulb socket. Context determiner 330 may determine that IoT device 402 has established a communication link with IoT device 406, that IoT device 406 is powered via a wired power source, and that IoT device 406 has established a communication link with WAP 404 based on characteristics provided by beacon surveyor 320 of IoT devices 406 and/or 406. Context determiner 330 may determine whether the signal reliability is greater via such a communication link or via the direct communication link with WAP 404, as shown in FIG. 4A. If the signal reliability is greater via the communication link with IoT device 406, context determiner 330 may provide an indication to intermediate device-based scheme selector 334, accordingly. Intermediate device-based scheme selector 334 may determine whether IoT device 402 and IoT device 406 each support a plurality of wireless communication protocols and selects a communication scheme that utilizes a particular wireless communication protocol from the plurality of wireless communication protocol that imposes the lowest power consumption burden for IoT device 402. If IoT device 402 and IoT device 406 do not support such a wireless communication protocol, intermediate device-based scheme selector 334 may determine whether IT device 402 and IoT device 404 are included in the same mesh network. If so, then intermediate device-based scheme selector 334 may select a communication scheme that leverages power optimizations available via the mesh network (e.g., configurable DTIM settings). If the signal reliability is greater via the direct communication link with WAP 404 and/or no intermediate device-based scheme is applicable, a determination may be made that IoT device 406 is not to be used to relay signals to WAP 404, and a WAP-based scheme may be utilized instead.

Figure 5:
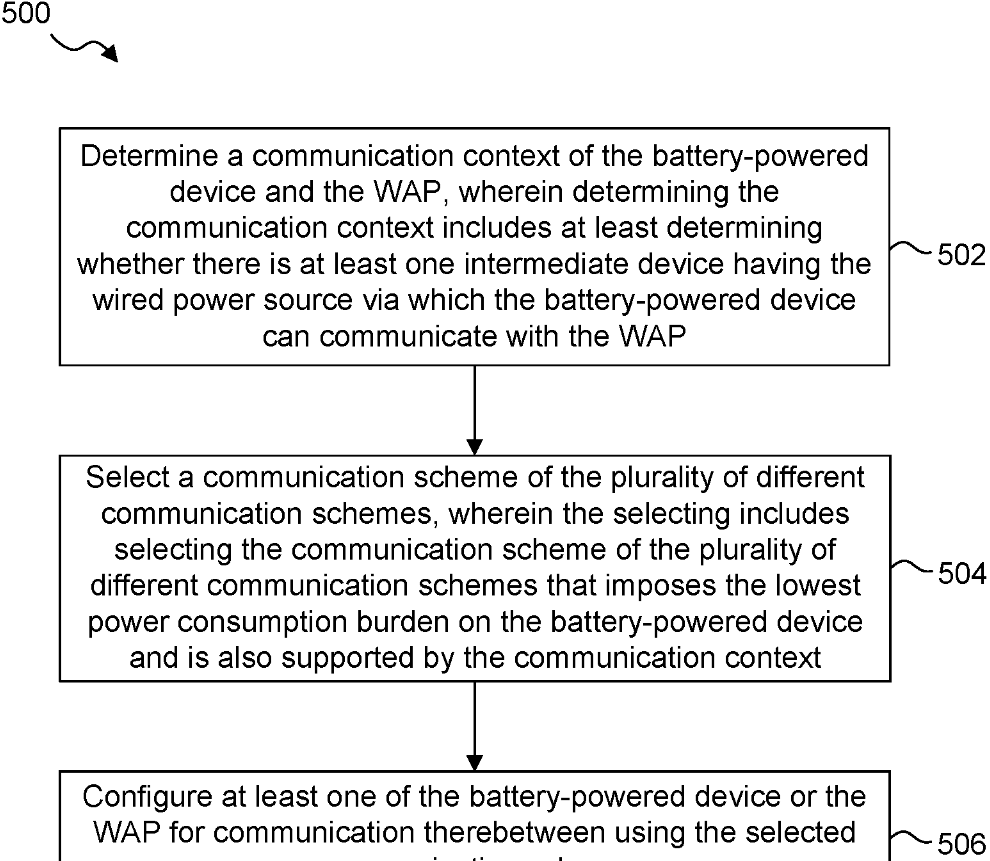
FIG. 5 is a flowchart for a method for establishing a communication link between a battery-powered device and a wireless access point (WAP), according to an embodiment.

FIG. 5 is a flowchart for a method 500 for establishing a communication link between a battery-powered device and a WAP, according to an embodiment. The battery-powered device and the WAP may be configurable for communication therebetween utilizing one of a plurality of different communication schemes each of which imposes a different power consumption burden on the battery-powered device. The plurality of different communication schemes may include one or more schemes in which the battery-powered device communicates directly with the WAP and one or more schemes in which the battery-powered device communicates indirectly with the WAP through at least one intermediate device having a wired power source. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to communication scheme determiner 312 of FIG. 3, which is one example of a communication scheme determiner. However, method 500 is not limited to that example embodiment.

In 502, context determiner 330 may determine a communication context of the battery-powered device (e.g., IoT device 302) and WAP 308, wherein determining the communication context includes at least determining whether there is at least one intermediate device (e.g., IoT device 306) having the wired power source (e.g., wired power source(s) 316) via which the battery-powered device can communicate with WAP 308.

In 504, WAP-based scheme selector 332 or intermediate device-based scheme selector 334 may select a communication scheme of the plurality of different communication schemes (e.g., communication schemes of data store 336), wherein the selecting includes selecting the communication scheme of the plurality of different communication schemes that imposes the lowest power consumption burden on the battery-powered device and is also supported by the communication context.

In 506, WAP-based scheme selector 332 or intermediate device-based scheme selector 334 may configure at least one of the battery-powered device or WAP 308 for communication therebetween using the selected communication scheme.

Figure 6:
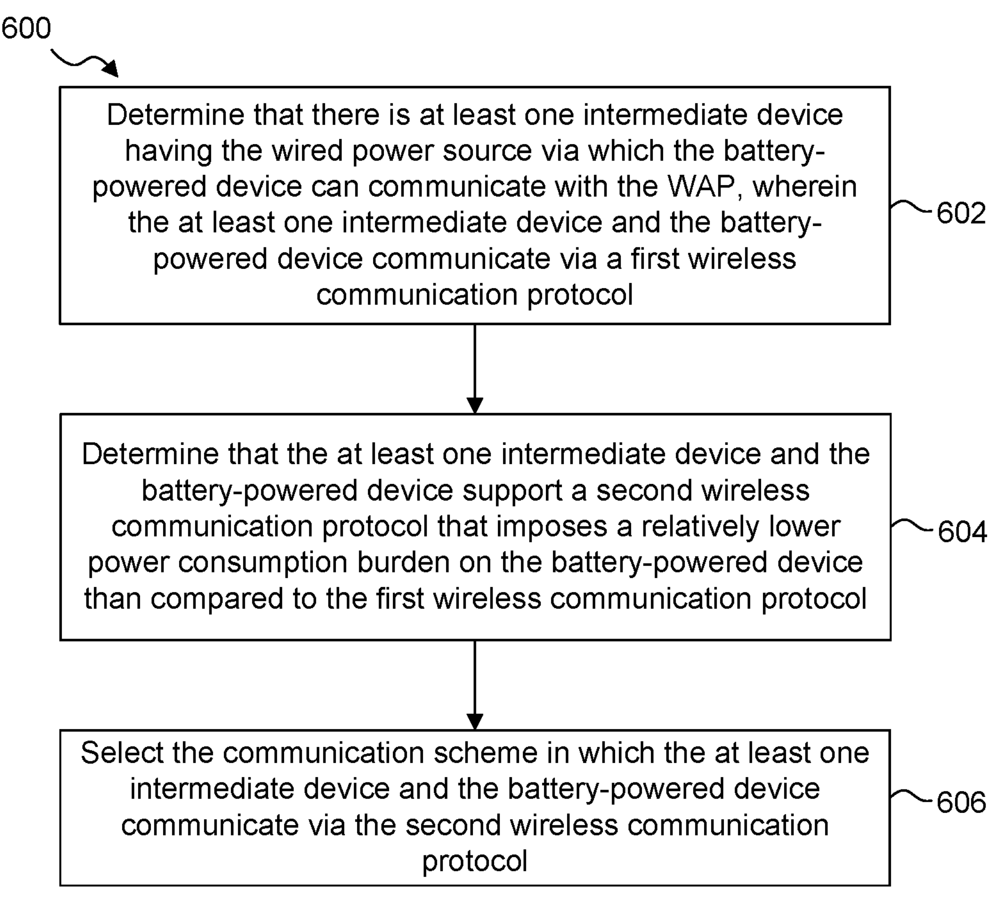
FIG. 6 is a flowchart for a method for establishing a communication link between a battery-powered device and a WAP via an intermediate device, according to an embodiments.

FIG. 6 is a flowchart for a method 600 for establishing a communication link between a battery-powered device and a WAP via an intermediate device, according to an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to communication scheme determiner 312 of FIG. 3, which is one example of a communication scheme determiner. However, method 600 is not limited to that example embodiment.

In 602, context determiner 330 may determine that there is at least one intermediate device (e.g., IoT device 306) having the wired power source (e.g., wired power source(s) 316) via which the battery-powered device (e.g., IoT device 302) can communicate with WAP 308, wherein the at least one intermediate device and the battery-powered device communicate via a first wireless communication protocol.

In 604, intermediate device-based scheme selector 334 may determine that the at least one intermediate device and the battery-powered device support a second wireless communication protocol that imposes a relatively lower power consumption burden on the battery-powered device than compared to the first wireless communication protocol.

In 606, intermediate device-based scheme selector 334 may select the communication scheme in which the at least one intermediate device and the battery-powered device communicate via the second wireless communication protocol. For example, as described herein, the first wireless communication protocol comprises a Wi-Fi-based communication protocol and the second wireless communication protocol comprises a BLE long range-based communication protocol.

Figure 7:
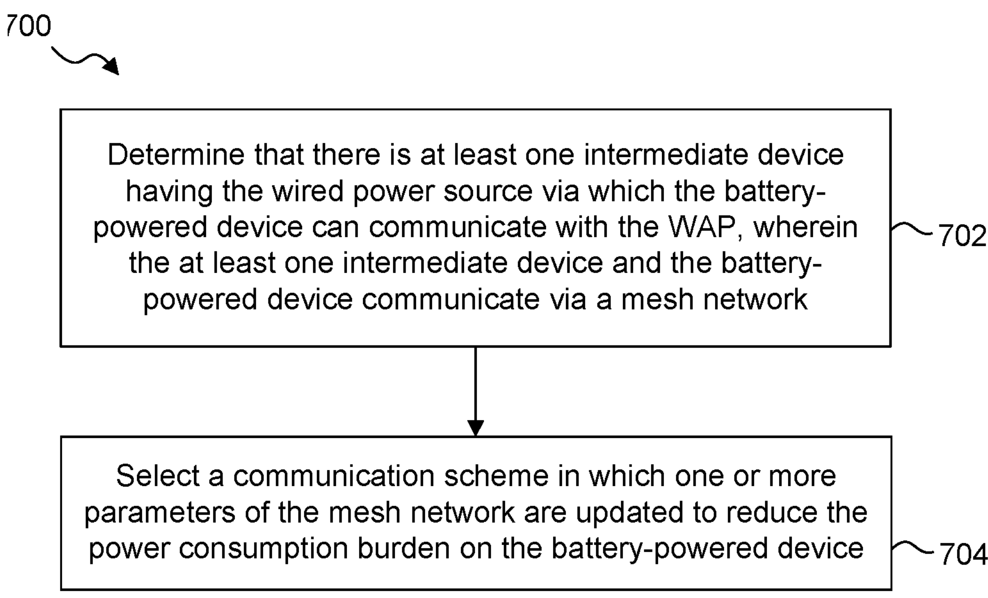
FIG. 7 is a flowchart for a method for establishing a communication link between a battery-powered device and a WAP via an intermediate device, according to another embodiment.

FIG. 7 is a flowchart for a method 700 for establishing a communication link between a battery-powered device and a WAP via an intermediate device, according to another embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to communication scheme determiner 312 of FIG. 3, which is one example of a communication scheme determiner. However, method 700 is not limited to that example embodiment.

In 702, context determiner 330 may determine that there is at least one intermediate device (e.g., IoT device 306) having the wired power source (e.g., wired power source(s) 316) via which the battery-powered device (e.g., IoT device 302) can communicate with WAP 308, wherein the at least one intermediate device and the battery-powered device communicate via a mesh network. In an example, intermediate device-based scheme selector 334 may determine that the at least one intermediate device and the battery-powered device communicate via the mesh network.

In 704, intermediate device-based scheme selector 334 may select a communication scheme in which one or more parameters of the mesh network are updated to reduce the power consumption burden on the battery-powered device. For example, as described herein, the parameter(s) may include a DTIM interval setting associated with at least one of the battery-powered device or the at least one intermediate device.

Figure 8:
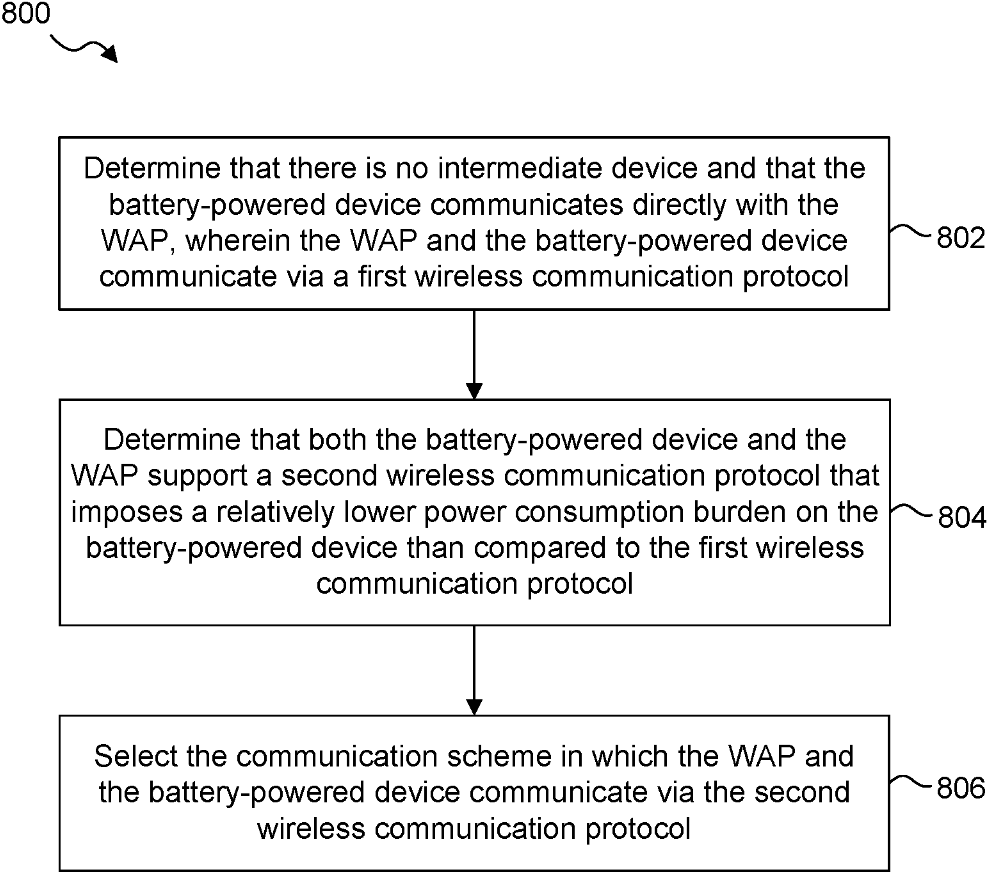
FIG. 8 is a flowchart for a method for establishing a direct communication link between a battery-powered device and a WAP, according to an embodiment.

FIG. 8 is a flowchart for a method 800 for establishing a direct communication link between a battery-powered device and a WAP, according to an embodiment. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to communication scheme determiner 312 of FIG. 3, which is one example of a communication scheme determiner. However, method 800 is not limited to that example embodiment.

In 802, context determiner 330 may determine that there is no intermediate device and that the battery-powered device (e.g., IoT device 302) communicates directly with WAP 308, wherein WAP 308 and the battery-powered device communicate via a first wireless communication protocol.

In 804, WAP-based scheme selector 332 may determine that both the battery-powered device and WAP 308 support a second wireless communication protocol that imposes a relatively lower power consumption burden on the battery-powered device than compared to the first wireless communication protocol.

In 806, WAP-based scheme selector 332 may select the communication scheme in which WAP 308 and the battery-powered device communicate via the second wireless communication protocol. For example, as described herein, the first wireless communication protocol comprises a Wi-Fi 5-based communication protocol and the second wireless communication protocol comprises a Wi-Fi 6-based communication protocol.

Figure 9:
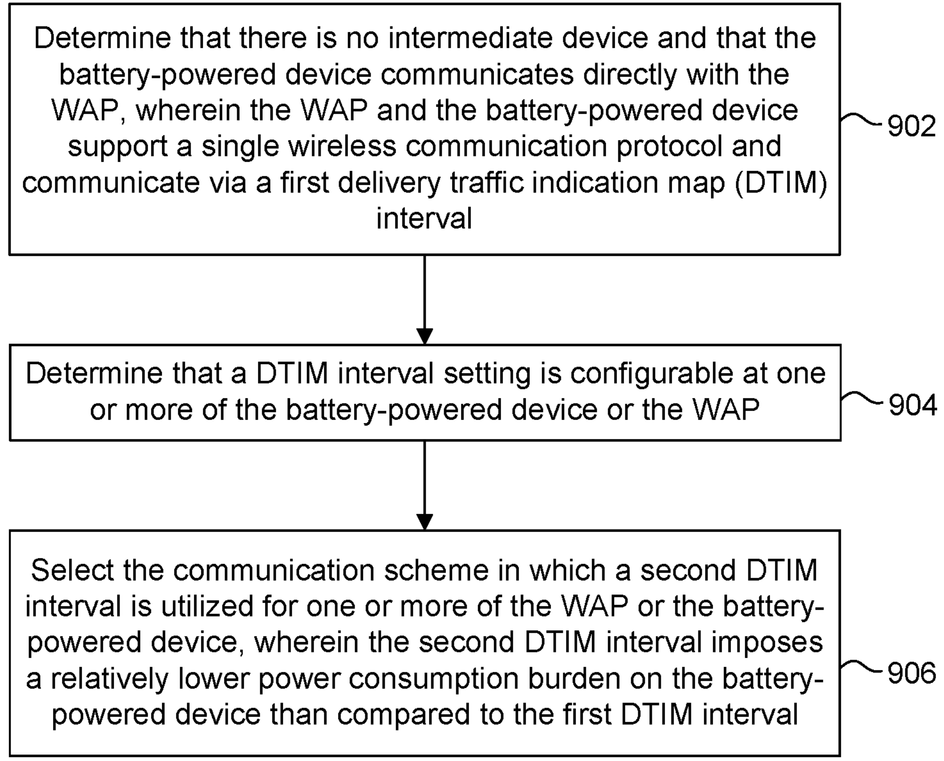
FIG. 9 is a flowchart for a method for establishing a direct communication link between a battery-powered device and a WAP, according to another embodiment.

FIG. 9 is a flowchart for a method 900 for establishing a direct communication link between a battery-powered device and a WAP, according to another embodiment. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to communication scheme determiner 312 of FIG. 3, which is one example of a communication scheme determiner. However, method 900 is not limited to that example embodiment.

In 902, context determiner 330 may determine that there is no intermediate device and that the battery-powered device (e.g., IoT device 302) communicates directly with WAP 308, wherein WAP 308 and the battery-powered device support a single wireless communication protocol and communicate via a first DTIM interval. For example, WAP-based scheme selector 332 may determine that WAP 308 and the battery-powered device support a single wireless communication protocol and communicate via a first DTIM interval.

In 904, WAP-based scheme selector 332 may determine that a DTIM interval setting is configurable at one or more of the battery-powered device or WAP 308.

In 906, WAP-based scheme selector 332 may select the communication scheme in which a second DTIM interval is utilized for one or more of WAP 308 or the battery-powered device, wherein the second DTIM interval imposes a relatively lower power consumption burden on the battery-powered device than compared to the first DTIM interval.

Example Computer System

Figure 10:
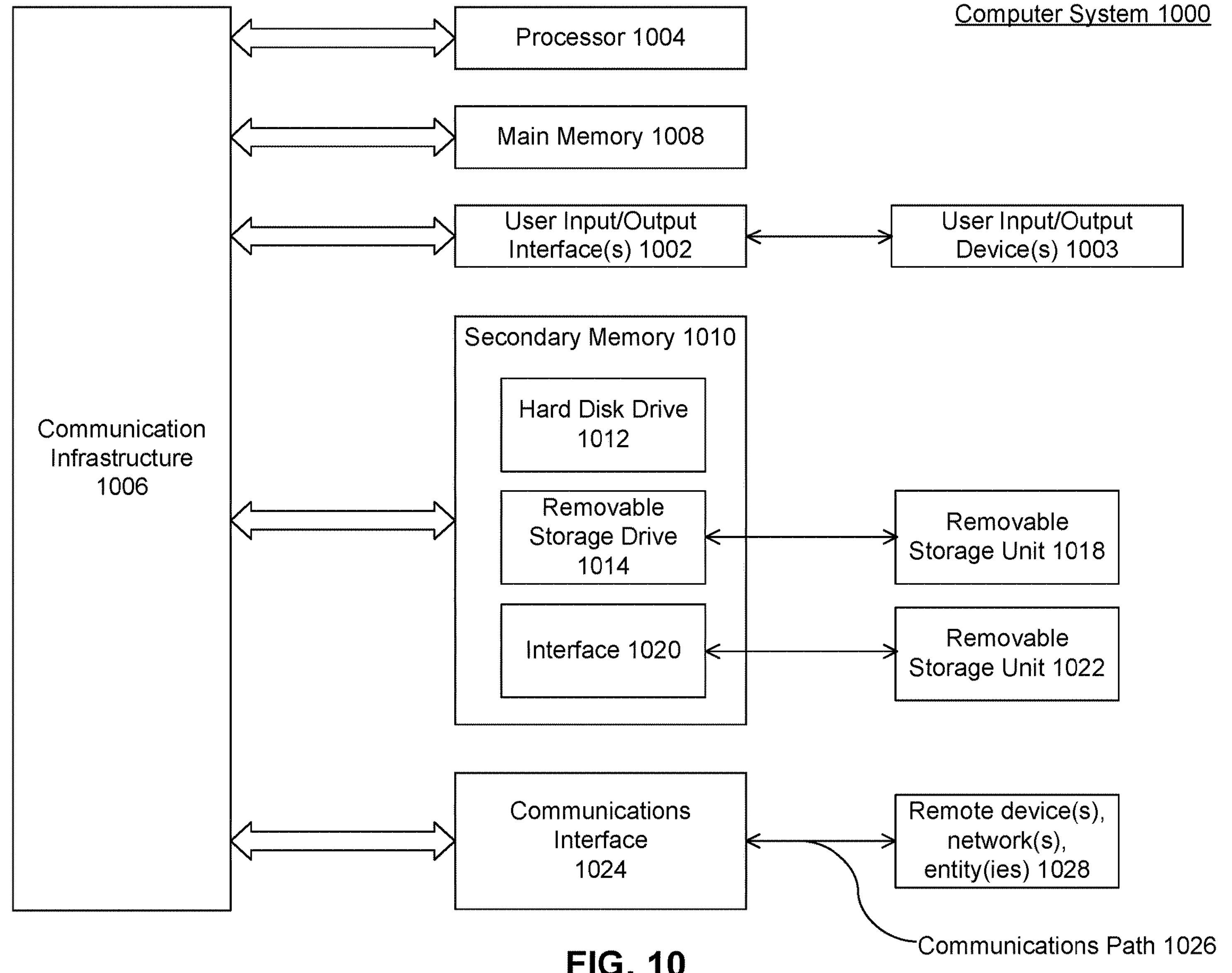
FIG. 10 illustrates an example computer system useful for implementing various embodiments.

Various embodiments may be implemented, for example, using one or more well-known computer systems, such as computer system 1000 shown in FIG. 10. For example, one or more of media device 106, remote control 110, content server(s) 120, system server(s) 126, communication scheme determiner component 128, beacon surveyor module 218, IoT devices 302, 304, and 306, WAP 308, mobile device 310, communication scheme determiner 312, frame generator 318, beacon surveyor 320, application 324, wireless interface(s) 326, wireless interface(s) 328, context determiner 330, WAP-based scheme selector 332, intermediate device-based scheme selector 334, plug-in(s) 338, plug-in(s) 340, IoT devices 402 and 406, and WAP 404 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for establishing a communication link between a battery-powered device and a wireless access point (WAP), the battery-powered device and the WAP being configurable for communication therebetween utilizing one of a plurality of different communication schemes each of which imposes a different power consumption burden on the battery-powered device, wherein the plurality of different communication schemes comprises one or more schemes in which the battery-powered device communicates directly with the WAP and one or more schemes in which the battery-powered device communicates indirectly with the WAP through at least one intermediate device having a wired power source, the computer-implemented method comprising:

receiving, by a server, characteristics of a plurality of devices including the battery-powered device and the WAP;

determining, by the server, a communication context of the battery-powered device and the WAP based on the characteristics, wherein determining the communication context comprises at least determining whether there is at least one intermediate device having the wired power source via which the battery-powered device can communicate with the WAP;

selecting, by the server, a communication scheme of the plurality of different communication schemes, wherein the selecting comprises selecting the communication scheme of the plurality of different communication schemes that imposes a lowest power consumption burden on the battery-powered device and is also supported by the communication context; and configuring, by the server, at least one of the battery-powered device or the WAP for communication therebetween using the selected communication scheme.

2. The computer-implemented method of claim 1, wherein:

determining the communication context of the battery-powered device and the WAP comprises:

determining that there is at least one intermediate device having the wired power source via which the battery-powered device can communicate with the WAP, wherein the at least one intermediate device and the battery-powered device communicate via a first wireless communication protocol; and determining that the at least one intermediate device and the battery-powered device support a second wireless communication protocol that imposes a relatively lower power consumption burden on the battery-powered device than compared to the first wireless communication protocol;

wherein selecting the communication scheme of the plurality of different communication schemes comprises selecting the communication scheme in which the at least one intermediate device and the battery-powered device communicate via the second wireless communication protocol.

3. The computer-implemented method of claim 2, wherein the first wireless communication protocol comprises a Wi-Fi-based communication protocol and the second wireless communication protocol comprises a Bluetooth Low Energy (BLE) long range-based communication protocol.

4. The computer-implemented method of claim 1, wherein:

determining the communication context of the battery-powered device and the WAP comprises determining that there is at least one intermediate device having the wired power source via which the battery-powered device can communicate with the WAP, wherein the at least one intermediate device and the battery-powered device communicate via a mesh network; and selecting the communication scheme of the plurality of different communication schemes comprises selecting a communication scheme in which one or more parameters of the mesh network are updated to reduce the power consumption burden on the battery-powered device.

5. The computer-implemented method of claim 4, wherein the one or more parameters comprise a delivery traffic indication map (DTIM) interval setting associated with at least one of the battery-powered device or the at least one intermediate device.

6. The computer-implemented method of claim 1, wherein:

determining the communication context of the battery-powered device and the WAP comprises:

determining that there is no intermediate device and that the battery-powered device communicates directly with the WAP, wherein the WAP and the battery-powered device communicate via a first wireless communication protocol; and determining that both the battery-powered device and the WAP support a second wireless communication protocol that imposes a relatively lower power consumption burden on the battery-powered device than compared to the first wireless communication protocol; and wherein selecting the communication scheme of the plurality of different communication schemes comprises selecting the communication scheme in which the WAP and the battery-powered device communicate via the second wireless communication protocol.

7. The computer-implemented method of claim 6, wherein the first wireless communication protocol comprises a Wi-Fi 5-based communication protocol and the second wireless communication protocol comprises a Wi-Fi 6-based communication protocol.

8. The computer-implemented method of claim 1, wherein:

determining the communication context of the battery-powered device and the WAP comprises:

determining that there is no intermediate device and that the battery-powered device communicates directly with the WAP, wherein the WAP and the battery-powered device support a single wireless communication protocol and communicate via a first delivery traffic indication map (DTIM) interval; and determining that a DTIM interval setting is configurable at one or more of the battery-powered device or the WAP; and wherein selecting the communication scheme of the plurality of different communication schemes comprises selecting the communication scheme in which a second DTIM interval is utilized for one or more of the WAP or the battery-powered device, wherein the second DTIM interval imposes a relatively lower power consumption burden on the battery-powered device than compared to the first DTIM interval.

9. A system for establishing a communication link between a battery-powered device and a wireless access point (WAP), the battery-powered device and the WAP being configurable for communication therebetween utilizing one of a plurality of different communication schemes each of which imposes a different power consumption burden on the battery-powered device, wherein the plurality of different communication schemes comprises one or more schemes in which the battery-powered device communicates directly with the WAP and one or more schemes in which the battery-powered device communicates indirectly with the WAP through at least one intermediate device having a wired power source, comprising:

one or more memories; and at least one processor each coupled to at least one of the one or more memories and configured to perform operations comprising:

receiving, by a server, characteristics of a plurality of devices including the battery-powered device and the WAP;

determining, by the server, a communication context of the battery-powered device and the WAP based on the characteristics, wherein determining the communication context comprises at least determining whether there is at least one intermediate device having the wired power source via which the battery-powered device can communicate with the WAP;

selecting, by the server, a communication scheme of the plurality of different communication schemes, wherein the selecting comprises selecting the communication scheme of the plurality of different communication schemes that imposes a lowest power consumption burden on the battery-powered device and is also supported by the communication context; and configuring, by the server, at least one of the battery-powered device or the WAP for communication therebetween using the selected communication scheme.

10. The system of claim 9, wherein:

determining the communication context of the battery-powered device and the WAP comprises:

determining that there is at least one intermediate device having the wired power source via which the battery-powered device can communicate with the WAP, wherein the at least one intermediate device and the battery-powered device communicate via a first wireless communication protocol; and determining that the at least one intermediate device and the battery-powered device support a second wireless communication protocol that imposes a relatively lower power consumption burden on the battery-powered device than compared to the first wireless communication protocol;

wherein selecting the communication scheme of the plurality of different communication schemes comprises selecting the communication scheme in which the at least one intermediate device and the battery-powered device communicate via the second wireless communication protocol.

11. The system of claim 10, wherein the first wireless communication protocol comprises a Wi-Fi-based communication protocol and the second wireless communication protocol comprises a Bluetooth Low Energy (BLE) long range-based communication protocol.

12. The system of claim 9, wherein:

determining the communication context of the battery-powered device and the WAP comprises determining that there is at least one intermediate device having the wired power source via which the battery-powered device can communicate with the WAP, wherein the at least one intermediate device and the battery-powered device communicate via a mesh network; and selecting the communication scheme of the plurality of different communication schemes comprises selecting a communication scheme in which one or more parameters of the mesh network are updated to reduce the power consumption burden on the battery-powered device.

13. The system of claim 12, wherein the one or more parameters comprise a delivery traffic indication map (DTIM) interval setting associated with at least one of the battery-powered device or the at least one intermediate device.

14. The system of claim 9, wherein:

determining the communication context of the battery-powered device and the WAP comprises:

determining that there is no intermediate device and that the battery-powered device communicates directly with the WAP, wherein the WAP and the battery-powered device communicate via a first wireless communication protocol; and determining that both the battery-powered device and the WAP support a second wireless communication protocol that imposes a relatively lower power consumption burden on the battery-powered device than compared to the first wireless communication protocol; and wherein selecting the communication scheme of the plurality of different communication schemes comprises selecting the communication scheme in which the WAP and the battery-powered device communicate via the second wireless communication protocol.

15. The system of claim 14, wherein the first wireless communication protocol comprises a Wi-Fi 5-based communication protocol and the second wireless communication protocol comprises a Wi-Fi 6-based communication protocol.

16. The system of claim 9, wherein:

determining the communication context of the battery-powered device and the WAP comprises:

determining that there is no intermediate device and that the battery-powered device communicates directly with the WAP, wherein the WAP and the battery-powered device support a single wireless communication protocol and communicate via a first delivery traffic indication map (DTIM) interval; and determining that a DTIM interval setting is configurable at one or more of the battery-powered device or the WAP; and wherein selecting the communication scheme of the plurality of different communication schemes comprises selecting the communication scheme in which a second DTIM interval is utilized for one or more of the WAP or the battery-powered device, wherein the second DTIM interval imposes a relatively lower power consumption burden on the battery-powered device than compared to the first DTIM interval.

17. A non-transitory computer-readable medium having instructions stored thereon that, when executed by at least one computing device, cause the at least one computing device to perform operations comprising:

receiving, by a server, characteristics of a plurality of devices including a battery-powered device and a wireless access point (WAP);

determining, by the server, a communication context of the battery-powered device and the WAP based on the characteristics, the battery-powered device and the WAP being configurable for communication therebetween utilizing one of a plurality of different communication schemes each of which imposes a different power consumption burden on the battery-powered device, wherein the plurality of different communication schemes comprises one or more schemes in which the battery-powered device communicates directly with the WAP and one or more schemes in which the battery-powered device communicates indirectly with the WAP through at least one intermediate device having a wired power source, and wherein determining the communication context comprises at least determining whether there is at least one intermediate device having the wired power source via which the battery-powered device can communicate with the WAP;

selecting, by the server, a communication scheme of the plurality of different communication schemes, wherein the selecting comprises selecting the communication scheme of the plurality of different communication schemes that imposes a lowest power consumption burden on the battery-powered device and is also supported by the communication context; and configuring, by the server, at least one of the battery-powered device or the WAP for communication therebetween using the selected communication scheme.

18. The non-transitory computer-readable medium of claim 17, wherein:

determining the communication context of the battery-powered device and the WAP comprises:

determining that there is at least one intermediate device having the wired power source via which the battery-powered device can communicate with the WAP, wherein the at least one intermediate device and the battery-powered device communicate via a first wireless communication protocol; and determining that the at least one intermediate device and the battery-powered device support a second wireless communication protocol that imposes a relatively lower power consumption burden on the battery-powered device than compared to the first wireless communication protocol;

wherein selecting the communication scheme of the plurality of different communication schemes comprises selecting the communication scheme in which the at least one intermediate device and the battery-powered device communicate via the second wireless communication protocol.

19. The non-transitory computer-readable medium of claim 18, wherein the first wireless communication protocol comprises a Wi-Fi-based communication protocol and the second wireless communication protocol comprises a Bluetooth Low Energy (BLE) long range-based communication protocol.

20. The non-transitory computer-readable medium of claim 17, wherein:

determining the communication context of the battery-powered device and the WAP comprises determining that there is at least one intermediate device having the wired power source via which the battery-powered device can communicate with the WAP, wherein the at least one intermediate device and the battery-powered device communicate via a mesh network; and selecting the communication scheme of the plurality of different communication schemes comprises selecting a communication scheme in which one or more parameters of the mesh network are updated to reduce the power consumption burden on the battery-powered device.

* * * * *